June 25, 1957 H. H. WOERDEMANN 2,797,382
MAGNETIC FREQUENCY AND VOLTAGE CONTROL FOR MOTOR GENERATOR
Filed May 2, 1952 2 Sheets-Sheet 1

INVENTOR.
HUGO H. WOERDEMANN
BY
William R. Lane
ATTORNEY

United States Patent Office 2,797,382
Patented June 25, 1957

2,797,382

MAGNETIC FREQUENCY AND VOLTAGE CONTROL FOR MOTOR GENERATOR

Hugo H. Woerdemann, Whittier, Calif., assignor to North American Aviation, Inc.

Application May 2, 1952, Serial No. 285,778

8 Claims. (Cl. 322—16)

This invention relates to the control of the frequncy and voltage output of a motor driven generator, and particularly to a magnetic device for effecting such control.

The output frequency of an alternating current generator is directly dependent upon the speed at which the generator is driven, since the number of poles is fixed. The voltage output, on the other hand, is dependent upon the field excitation of the generator as well as upon the speed of rotation thereof. This invention contemplates a single reference device and associated apparatus for controlling both the output frequency and output voltage of a motor driven alternator.

It is an object of this invention to provide a frequency and voltage control for a generator which is adapted to withstand substantially the same ambient conditions as the alternator itself is capable of withstanding.

It is another object of this invention to provide a simplified and improved frequency and voltage control for a motor generator.

It is another object of this invention to provide a motor generator frequency and voltage control which does not utilize vacuum tubes.

It is another object of this invention to provide a frequency and voltage control for a motor generator which has improved sensitivity.

It is another object of this invention to provide a frequency control which does not require a separate frequency source as a reference.

It is another object of this invention to provide a voltage control which does not require a separate voltage reference.

Figure 1:
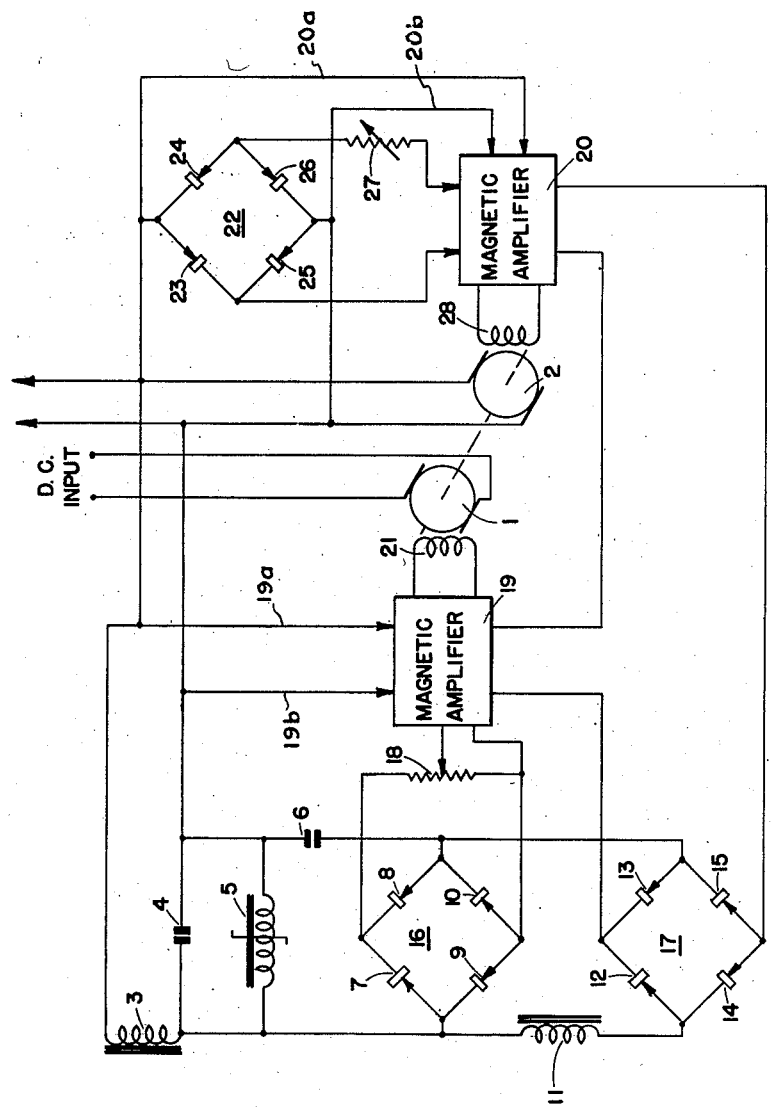
Figure 2:
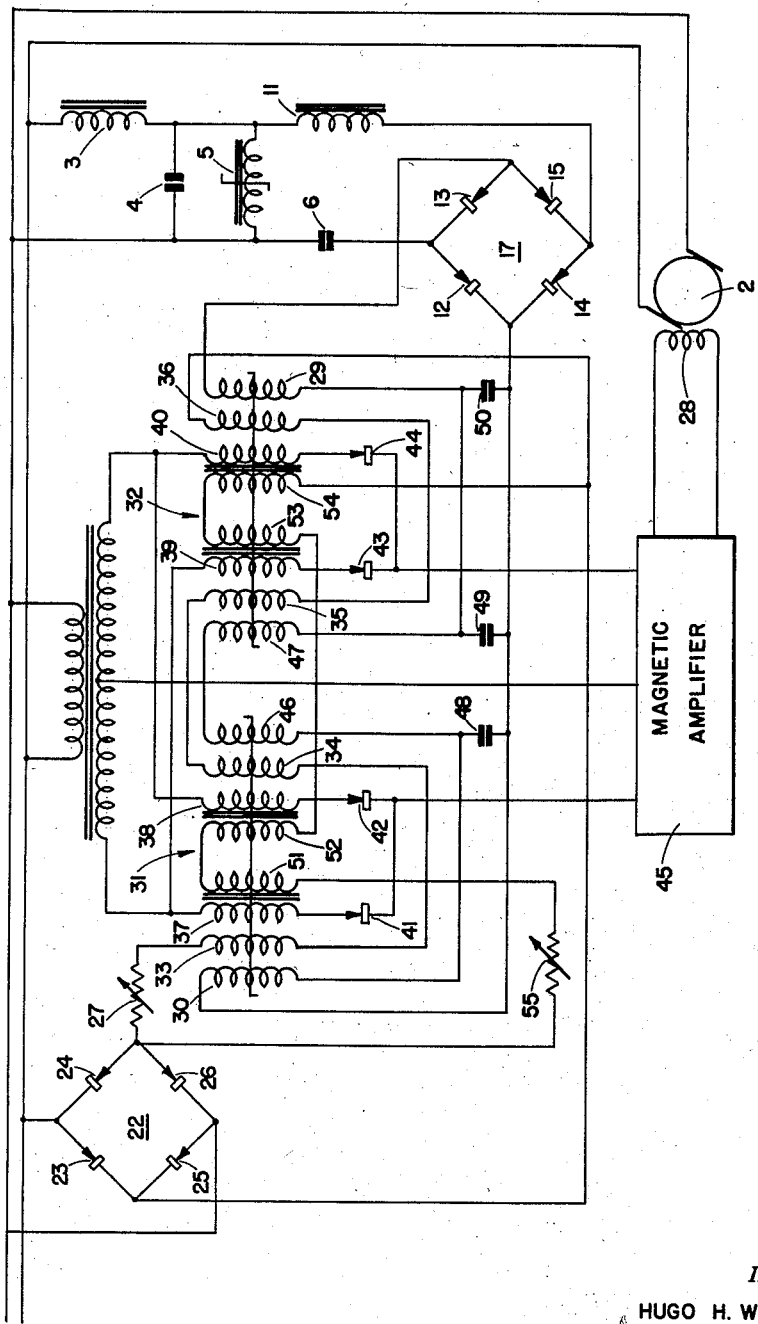

Other objects of invention will become apparent from the following description taken in connection with the accompanying drawings, in which:

Fig. 1 is a schematic diagram of the invention;

And Fig. 2 is a detailed electrical diagram of a part of the invention.

Referring to Fig. 1, there is shown a motor 1, shaft-connected or otherwise drivingly connected to an alternating current generator 2. Motor 1 receives its input from any convenient power source, such as a direct current source. The output of generator 2 is connected, as shown, to inductor 3 and to capacitor 4 and saturable reactor 5 in parallel. The voltage developed across saturable reactor 5 is communicated by capacitor 6 to rectifier bridge 16 containing rectifiers 7, 8, 9, and 10, and through inductance 11 to rectifier bridge 17 containing rectifiers 12, 13, 14, and 15. The output of rectifier bridge 16 is fed through variable resistance 18 to magnetic amplifier 19 which receives power from generator 2 via leads 19a and 19b. The output of rectifier bridge 17 is fed to control windings in magnetic amplifiers 19 and 20 in series. The output of magnetic amplifier 19 is connected to field winding 21 of motor 1. The output voltage of generator 2 is connected to rectifier bridge 22 which includes rectifiers 23, 24, 25, and 26. The output of this bridge is fed through variable resistance 27 to magnetic amplifier 20 which also receives the output of rectifier bridge 17. Power for magnetic amplifier 20 is furnished from generator 2 via leads 20a and 20b. The output of magnetic amplifier 20 is fed to generator field winding 28. It is desired to control not only the frequency but also the voltage of the output of generator 2. Accordingly, the output of the generator is fed through inductor 3 to capacitor 4 and saturable reactor 5 in parallel. Saturable reactor 5 is preferably wound on a core composed of 50–50 nickel iron grain-oriented material so that for a constant frequency the voltage drop across saturable reactor 5 remains constant despite voltage fluctuations in the signal applied thereto. Capacitor 4 furnishes relatively short-duration heavy discharge currents to the saturable reactor to insure that saturation occurs every half cycle and that the voltage across the saturable reactor remains constant despite possible fluctuations in the voltage output of generator 2. Inductor 3 is provided to prevent discharge of capacitor 4 through any path other than through the saturable reactor. Characteristics of the saturable reactor are such that with a change in frequency, however, the voltage drop across the saturable reactor changes. Thus if the frequency of generator 2 rises, the voltage drop across saturable reactor 5 rises; and if the frequency of generator 2 decreases, the voltage across saturable reactor 5 decreases. This change in voltage drop is strictly linear with respect to the frequency and, whatever the voltage drop, it is communicated by capacitor 6 to rectifier bridge 16 which feeds magnetic amplifier 19. This same voltage is supplied through inductor 11 to rectifier bridge 17. The characteristics of inductor 11, however, are such that with an increase in frequency, the current therethrough decreases, and with a decrease in frequency the current therethrough increases. The current through inductor 11 is therefore independent both of the voltage and the frequency of generator 2, since the current flowing through inductor 11 varies linearly and inversely with the applied frequency, and the voltage applied to inductor 11 varies directly with the frequency. The current flowing in inductor 11 is rectified by rectifier bridge 17 and is applied to control windings of magnetic amplifiers 19 and 20. The line voltage of generator 2 is also applied to rectifier bridge 22, the output of which is fed through variable resistance 27 to one of the control windings of magnetic amplifier 20. Power for magnetic amplifier 20 is derived directly from the output of generator 2. Now, the outputs of rectifier bridges 16, 17, and 22 are applied to the control windings of magnetic amplifiers 19 and 20 in the sense required to effect a subtraction of the fluxes which would tend to be produced by the current derived from these bridges. In other words, the net flux produced in the saturable reactor cores of magnetic amplifier 19 depends upon the difference between the current flowing as a result of rectifier bridge 16, and the current flowing as a result of rectifier bridge 17. The net effect, then, is that the output of magnetic amplifier 19, as fed to motor field winding 21, is proportional to the difference between a constant current as derived from inductor 11 and a current which is dependent upon the voltage drop across saturable reactor 5. Since the voltage drop across saturable reactor 5 is directly proportional to the frequency of the output of generator 2, it follows that the output of magnetic amplifier 19 and the current flowing in motor field winding 21 is directly related to the deviation in frequency of generator 2. In other words, if the frequency of generator 2 rises, the voltage drop across saturable reactor 5 rises, but the current flowing through inductor 11 remains constant—this, in spite of any voltage change which might have accompanied the frequency change in the output of generator 2; the voltage applied to resistance 18 rises, and hence the current through the control winding of magnetic amplifier 19, which is connected to resistance 18, rises; but the current flowing through the control winding of magnetic amplifier 19, which is connected to rectifier bridge 17, remains constant. Since the two control windings are arranged to subtract from one another, i. e., the flux produced by the control winding connected to rectifier bridge 17 subtracts from the flux produced by the control winding connected to rectifier bridge 16, the current in motor field winding 21 is increased, the speed of motor 1 decreases, and the frequency of the output of generator 2 is thus caused to decrease. Thus the frequency of the output of generator 2 is caused to remain constant, since an opposite correcting effect is achieved if the output frequency of generator 2 tends to decrease.

Magnetic amplifier 20 also has two different sets of control windings, one responsive to rectifier bridge 17 and the other responsive to rectifier bridge 22. The current flowing in resistance 27 is directly related to the line voltage, since rectifier bridge 22 is connected directly across the output of generator 2. This current is applied to one control winding of magnetic amplifier 20, and another control winding responsive to current flowing through rectifier bridge 17 is arranged in a subtractive sense, as in magnetic amplifier 19. In order to have this subtraction occur, decoupling means are provided, such that the voltages developed in the respective windings do not influence each other. Such decoupling means is provided in this invention by making resistor 27 relatively large. If the voltage output of generator 2 rises, responsive perhaps to a decrease in load, the current through resistance 27 rises and subtracts to a greater extent from the effect produced by current derived from rectifier bridge 17. The output of magnetic amplifier 20 therefore decreases, and the current in generator field winding 28 decreases, resulting in a decrease in the output voltage of generator 2. An opposite effect occurs, of course, when the output voltage of the generator decreases. Thus the output voltage of generator 2 is caused to remain constant, and since the output voltage, by virtue of the network comprising essentially capacitor 4, saturable reactor 5, and rectifier bridges 16 and 17, has no effect upon the frequency control of the device, an unusually precise and sensitive voltage and frequency control is provided. Magnetic amplifiers 19 and 20, of course, could be replaced by conventional vacuum tube amplifiers, but the advantage of such an expedient does not compare with the use of magnetic amplifiers, because of their superior life expectancy and trouble-free operation. The manner in which the control windings of magnetic amplifiers 19 and 20 may be arranged to effect the various subtractions to which allusion has been made is illustrated in Fig. 2, which shows generator 2 and two-stage magnetic amplifier circuitry designed to perform the same function as part of the circuit shown in Fig. 1, i. e., that which is required to control the voltage output of generator 2. Constant current flowing through inductor 11 is rectified by rectifier 17 and passes through control windings 29, 30, 46, and 47 of magnetic amplifiers 31 and 32 arranged in push-pull fashion. Condenser 6 prevents the flow of any direct current which may develop due to nonsymmetry of rectifier circuit 17 through saturable reactor 5, thereby destroying its reference properties. Decoupling condensers 48, 49, and 50 are provided so that the a-c voltages developed across the windings of the magnetic amplifiers do not influence the reference circuit. The current output of rectifier bridge 22 is supplied to control windings 33, 34, 35, 36, 51, 52, 53, and 54 and may be adjusted in amplitude by resistors 27 and 55 respectively, which may also serve for decoupling purposes. Windings 29, 30, 33, 34, 35, 36, 46, and 47 are arranged so that the effective ampere turns developed by their respective currents cancel if the currents are equal. The current through windings 33, 34, 35, 36, 51, 52, 53, and 54 changes in exact proportion to line voltage changes, while the current through windings 29, 30, 46, and 47 remains constant. Thus a subtraction of magnetomotive forces takes place in the amplifiers, and the remaining difference, which is proportional to the deviation of the line voltage from its predetermined value (adjusted by means of resistor 27) is highly amplified in amplifiers 31 and 32. Load windings 37, 38, 39, and 40 supply output power through rectifiers 41, 42, 43, and 44 to magnetic amplifier 45 which in turn controls field winding 28. The output current of the amplifiers is therefore proportional in polarity and amplitude to the deviation of the line voltage from its nominal value. This current can either be used directly in small machinery to control the field currents so as to reduce the line voltage to its nominal value, or it can be used, as illustrated, as an input signal to a magnetic power amplifier if large field currents are involved.

It is to be noted that no separate voltage or frequency reference is required, i. e., no vibrating reed, tuning fork, or crystal apparatus is used to provide a separate source of standard frequency, and no standard voltage cell or other source of a standard voltage other than that derived indirectly from the output of generator 2 is required. In addition, since the various controlling circuits have outputs in the form of forced current, such amplification and subtractions as are required are ideally achieved by the use of magnetic amplifiers involving no vacuum tubes. The device is therefore rugged and relatively free of the necessity for frequent maintenance attendant upon use of devices incorporating vacuum tubes.

Although the invention has been illustrated and described in detail, it is to be clearly understood that the same is by way of illustration and example only and is not to be taken by way of limitation, the spirit and scope of this invention being limited only by the terms of the appended claims.

I claim:

1. Means for controlling the frequency and voltage output of a motor-driven alternating current generator comprising means responsive to the output of said generator for producing an A.-C. voltage which is independent of the voltage output of said generator but which varies directly with the frequency of said generator output, means for producing a current proportional to said voltage, means responsive to said voltage for producing an electric current independent for its value upon the voltage or frequency of said output, means responsive to the output of said generator for producing an electric current directly proportional to the voltage output of said generator, means responsive to the difference between the first and second of said currents for controlling the speed of said motor, and means responsive to the second and third of said currents for controlling the voltage output of said generator to thereby control the frequency and voltage of the output of said generator.

2. Means for controlling the frequency of the output of an alternating current generator which is motor-driven comprising means for producing a voltage independent of the voltage output of said generator and directly proportional to the frequency of the output of said generator, means for producing a current from said voltage which is independent of the frequency and voltage of the output of said generator, means for producing a current proportional to said voltage, and means responsive to the difference between said currents for controlling the speed of said motor to thereby control the frequency of the output of said generator.

3. A device as recited in claim 2 and further comprising means for producing a current directly proportional to the voltage output of said generator, and means responsive to the difference between said first and last-named currents for controlling the voltage output of said generator to thereby control both the voltage and frequency of the output of said generator.

4. Means for controlling the frequency and voltage of the output of an alternating current generator comprising means for producing a constant current, means for producing a current proportional to the frequency of said output, means for producing a current proportional to said voltage, means for controlling the speed of said generator in response to said first and second currents, and means for controlling the field excitation of said generator in response to the first and third of said currents to thereby control the frequency and voltage of the output of said generator.

5. A device as recited in claim 4 in which said means for producing a current proportional to said frequency comprises an inductor connected by one of its terminals to one terminal of said source, and a saturable reactor and a capacitor connected in parallel between the other terminals of said source and said inductor whereby the current in any conductor connecting the terminals of said saturable reactor is constant.

6. A device as recited in claim 4 in which said means for producing a constant current comprises an inductor connected to one terminal of said source, a saturable reactor and a capacitor connected in parallel across the other terminals of said source and said inductor, and a second inductor connected across said saturable reactor whereby the current in said second inductor is constant despite changes in voltage and frequency of said source.

7. Means for eliminating frequency deviations of an alternating current generator comprising a first inductor connected to one terminal of said generator, a capacitor and a saturable reactor connected in parallel between the other terminals of said first inductor and said generator, a second inductor connected across said saturable reactor, a resistor connected in parallel with said second inductor, and means responsive to the difference between the currents flowing in said resistor and in said second inductor for controlling the speed of said generator to thereby control the output frequency of said generator.

8. Means for controlling the frequency and voltage of the output of an A.-C. generator comprising means responsive to said output for producing an A.-C. voltage proportional to the frequency but independent of the voltage of said output, means for producing from said voltage a current proportional thereto, means for producing from said voltage a current independent of the voltage and frequency of the output of said generator, means for producing a current proportional to the voltage of said output, means responsive to the difference between said first and second currents for controlling the speed of said generator, and means responsive to the difference between said second and third currents for controlling the voltage output of said generator to thereby maintain said frequency and voltage constant.

References Cited in the file of this patent

UNITED STATES PATENTS

| | | |
|---|---|---|
| 2,021,752 | Suits | Nov. 19, 1935 |
| 2,504,489 | Bechberger | Apr. 18, 1950 |
| 2,524,166 | Gartner | Oct. 3, 1950 |
| 2,607,028 | Gartner | Aug. 12, 1952 |
| 2,629,853 | Harder et al. | Feb. 24, 1953 |
| 2,641,738 | Sikorra | June 9, 1953 |
| 2,675,518 | Morgan | Apr. 13, 1954 |
| 2,692,366 | Ransom et al. | Oct. 19, 1954 |
| 2,724,997 | Storm | Nov. 22, 1955 |